Aug. 27, 1968   A. O. WALPOLE   3,398,945
MOLTEN MATERIAL FURNACE HOLE CLOSURES
Filed Dec. 9, 1965
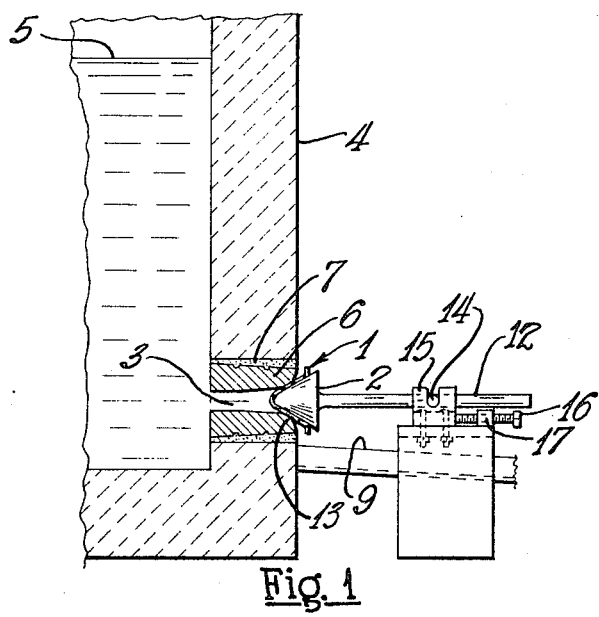
Fig. 1
Fig. 2
Fig. 3
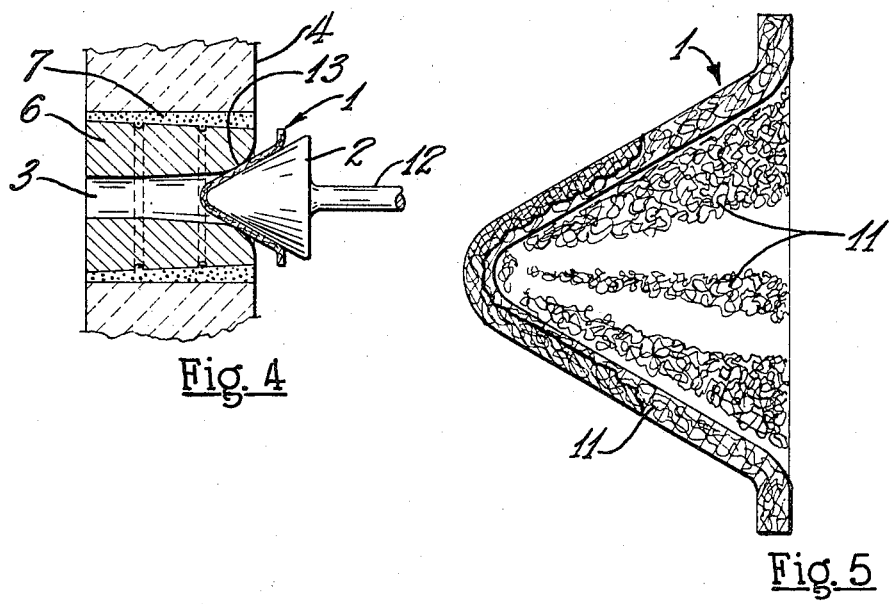
Fig. 4
Fig. 5
INVENTOR.
AUSTIN OLIVER WALPOLE
BY
ATTORNEYS 3,398,945
MOLTEN MATERIAL FURNACE
HOLE CLOSURES
Austin Oliver Walpole, Granville, Ohio, assignor to
Owens-Corning Fiberglas Corporation, a corporation of Delaware
Filed Dec. 9, 1965, Ser. No. 512,632
5 Claims. (Cl. 266—42)

ABSTRACT OF THE DISCLOSURE

Apparatus and method of stopping the flow of molten metal from a tap hole in a furnace including a sealant which fits over a stopple. The sealant is porous and allows a quantity of molten metal to flow thereinto and soldify to block any further flow of metal.

---

This invention relates to an improved means for sealing openings in a molten metal receptacle, particularly those openings around the plug used to close the tap hole of a melting furnace. It provides a sealant which when placed over the plug eliminates the need for a machined fit between the plug and the tap hole. It furthermore provides a sealant capable of withstanding high temperatures and not imparting any deleterious constituents to the molten metal in the furnace.

When closing a melting furnace tap hole, particularly in furnaces melting materials in the lower temperature ranges, it is customary to use a cast iron plug. A machined fit is not relied upon for closure because of the high temperatures and rough handling which the plug is exposed to tend to crack and fissure the surface of the cast iron plug causing leaks after minimal use of the system.

In order to provide an adequate sealant, various plug gaskets have been tried. A sealant commonly used is a clay gasket hand formed over the plug. It is found that the moisture of the clay necessary to form the gasket flashes into steam upon contact with the heat of the furnace causing the clay to explode where the moisture is concentrated. Furthermore, the closure is not reliable because of the crudeness of the gasket's form. Even when the fit is assured by inserting the plug with the clay sealant into the tap hole while the clay is soft, thereby molding the clay into a form fitting gasket, it still has a tendency to leak because of the inherent nature of the material and its tendency to form cracks and fissures.

The most damaging reason why clay is unsatisfactory is the clay has a tendency to fall from the plug into the molten metal. The clay contaminates the molten metal to the extent that the final product is badly affected. In cases where the metal is drawn into wire, the whole melt or final product has to be scrapped.

The present invention is designed to eliminate the foregoing deleterious and damaging effects occurring from the use of sealants which have been used for metal furnace tap holes to this time. The invention is based upon the discovery that a melting furnace sealant made of continuous filament glass fibers constructed in a prescribed manner will maintain its physical integrity and provide a sealant which prevents the escape of molten metal from a furnace or a molten metal receptacle.

The term continuous filament glass fibers as used herein refers to fibers made by continuously drawing and attenuating glass fibers from an orifice in a bushing or feeder at the bottom of a glass melting unit. Continuous filament glass fibers as so used distinguishes such fibers from discontinuous glass fibers which at a maximum are only a few inches in length.

A recent form in which continuous glass fibers have been made available is in the form of a mat. The mat is formed by pulling continuous filament glass fibers from their source and collecting them as a mass or swirled grouping on a conveyor with an appropriate binder to impart integrity to the mass as a network of glass fibers.

It is a member formed from a mat of the above continuous filament glass fibers which has been found according to the present invention to be of great benefit in solving the problem of sealing a melting furnace. Alternative forms of continuous fibers may be employed however, such as a mass of textile fibers grouped into an appropriate form and held with a binder.

One of the chief applications of this invention is in sealing aluminum melting furnaces. Aluminum is often used in applications where a high degree of strength is required thereby necessitating the elimination of foreign matter in the melted material. This invention is of considerable practical value therefore to the aluminum industry in providing increased strength and quality in aluminum products made from aluminum melted in units in which this invention is used. It has been found that where other furnace sealants are used, filtering of the molten aluminum is necessary to remove particles and contaminants which are introduced. The contaminant problem becomes quite critical when the aluminum is drawn into wire which requires a high strength-to-weight ratio.

In order to accommodate the use of this invention in aluminum furnaces, a sealant composed of glass having melting temperatures higher than aluminum should be used. It has been found that the glass composition disclosed in the patent issued to R. A. Schoenlaub, 2,334,961, functions well when used in the sealant disclosed herein. This glass in fibrous form has a melting temperature in excess of 1500° F.

Having briefly described my invention I will state that an object of this invention is to provide a removable sealant for tap holes in molten metal furnaces which is easily insertable in such holes and which will preclude leaks from such holes.

Another object of this invention is to provide a melting furnace sealant which will maintain its physical integrity under high temperature operating conditions.

Another object is to provide a sealant which will not impart any of its constituents to the molten metal.

Another object of this invention is to provide a sealant for melting furnace tap hole apertures which employs principles of heat conductivity thereby creating a more positive block to the flow of molten material therefrom.

A further object of this invention is to provide a melting furnace sealant which is resilient and will readily conform to a furnace plug without having to be specifically formed at the time of insertion, thus allowing for a uniform sealant to surround the melting furnace tap hole.

In the drawings:

FIGURE 1 is a cross sectional view of a furnace wall showing a tap hole with a plug in place and a sealant of the present invention overlying the plug. The figure further shows a means for maintaining the plug in place and a trough to facilitate the drawing off of the molten metal from the furnace.

FIGURE 2 shows the general configuration of the sealant member used in the melting furnace wall of FIGURE 1.

FIGURE 3 shows the general form of a variation of the conical sealant member of FIGURE 2 adaptable to use in other shaped apertures of melting furnaces.

FIGURE 4 is an enlarged portion of FIGURE 1 showing a plug with a sealant in place within the tap hole of the melting furnace.

FIGURE 5 is an enlarged cross sectional view of the conical sealant of FIGURES 1, 2 and 4 illustrating its make up of continuous glass fibers.

Referring more specifically to FIGURE 1, I have shown a metal furnace wall 4 and a tap hole 3 and trough 9. A plug 2 is in place with a sealant 1 of the present invention overlying the plug. The tap hole liner 6 is usually made of a high temperature material such as a silica carbide refractory. The liner 6 is cemented in place with a high temperature adhesive 7. The plug 2 which is inserted in the tap hole 3 is usually cast iron. The sealant 1 is made up of continuous filaments 11 of glass. As can be seen from FIGURE 1, because of the sealant member being in intimate contact with the material on the interior of the furnace any parts separating from the member will become an undesirable part of the molten metal, thus contaminating the metal.

The sealant is made of continuous filament fibrous glass 11, so that the fibers will not break off from the sealant 1 and become part of the melted metal 5. When made from continuous filaments 11 the sealant 1 does not rely upon any binders or adhesives to maintain the sealant 1 in its proper form during the period it is used.

The sealant 1 when in place prevents the flow of molten metal 5 from passing through the space between the plug 2 and the tap hole 3. In order to maintain the plug 2 in place, a suitable holding means 12 is connected to the back of the plug 2. The holding means 12 can be any suitable object as long as it is sufficient to keep the plug 2 tightly in place and retain the fibrous glass sealant 1 in snug fit relationship between the surfaces 13 of the liner 6 and the plug 2 so that there will be no part of the space between the tap hole 3 and the plug 2 unfilled by the sealant 1. The holding means in the present embodiment is shown being retained by trunnions 14 inserted in a movable journal receptacle 15 adjustable by means of a screw 16 threaded and attached to a support member 17.

When the sealant 1 and the plug 2 are in place as described above, the head of the molten metal 5 exerts pressure against the face of the plug 2 and sealant 1, inserted in the tap hole 3. If a sealant 1 were not placed in the space between the plug 2 and the tap hole 3, the molten metal 5 would leak out through irregularities between the tap hole 3 and the plug 2. The sealant 1 thus is in intimate contact with the molten metal 5 so as to be completely immersed in the molten metal 5 where the sealant 1 projects beyond the tangent point of the tap hole liner 6 and the sealant 1. Thus the sealant 1 must be capable of withstanding not only the pressure of the molten metal 5, but also the intense heat of the molten metal.

It has been found that no binder is suitable to maintain fibers in a proper sealing relationship after being raised to the temperature at which the sealant is exposed. High temperature inorganic binders are currently available, but their adhesive characteristics are such that they will not maintain a multiplicity of fibers within a fixed relationship. It is within the present state of the art of organic binders to maintain fibers in a fixed relationship. However, these binders when subjected to the operating temperatures to which they would be exposed burn, and do not maintain their adhesive characteristics. It is for the foregoing reasons that continuous fibers are necessary to effectively withstand the high temperature to which they are subjected and yet maintain the physical integrity of the object which they form. Short discontinuous glass fibers have been tried as melting furnace sealants using various forms of glass fibers. The various configurations and forms were unsuccessful and tended to disintegrate and become part of the melted metal. The melting temperature of the glass fibers should be in excess of the temperature to which they are exposed, however, as will be seen the disclosed method of fabrication with continuous fibers enables the sealant to withstand limited temperature exposures in excess of the melting temperature of the fiber.

The sealant is formed of continuous glass fibers by using either a mat of continuous glass fibers or fibers in textile form overlaid and integrated into a network. The forming is accompanied by a binder application which is in a sense, a fugitive binder, to maintain the structure in its appropriate shape. The shaping operation can be accomplished by drawing and holding continuous glass fibers in the form of textile strands or mat over a form by a vacuum placed thereunder. After the binder cures the structure will maintain the shape into which it was formed to facilitate bonding of the sealant and placement over the plug.

The sealant should be sufficiently thick so that the compressibility of the fibrous network, due to the inherent resilient character thereof, over the plug will allow conformity of the sealant to irregularities in shape between the plug and the tap hole permitting establishment of a snug fit relationship therewith. For example, it has been found that a sealant approximately three eighths of an inch in cross section provide the foregoing characteristics.

Preforming the sealant and using a binder to maintain the fibrous glass configuration provides a sealant which when placed over the plug is uniform in cross section in respect to the fibrous glass between the plug and the tap hole. Furthermore, using a preformed sealant of predetermined thickness conforming generally to the configuration of the plug minimizes the possibility of randon weak spots formed in the cross section of the sealant. An organic binder such as starch is used because of its good glass fiber bonding properties. When the sealant comes in contact with the molten metal, the binder combusts passing the colloidal elements or residue of the burned material in the form of combusted gas through interstices of the sealant to the atmosphere thereby precluding a substantial amount of binder particles from becoming part of the molten material.

The continuous filament glass fibers in the form of a sealant described herein have a tendency to retain air in the interstices, providing a cooling effect on the interior of the sealant and exchanging heat with the cooler air exterior to the furnace. When the sealant is removed after use, it is found that the molten aluminum or metal penetrates into the porous network of the fibrous material only a small portion of the cross section of the sealant. The explanation for this occurrence is that the air in the interstices of the sealant tends to cool the metal which manages to seep through. By means of the cooling action and the glass fiber reinforcement of the aluminum seepage, a metal sheel is formed which retains the molten aluminum.

The length of the fibers, in addition to playing an important part in carrying heat away to form the flow barrier, also is important in providing an integrated relationship for the fibers irrespective of the use of binder to provide a sealant easy to handle and install. The fibers are desirably of such length that many of them extend from the main body portion of the sealant to the zone between the plug and the refractory wall defining the aperture into which the sealant is inserted, thus permitting the plug to hold the entire fibrous network of the sealant in anchored relation over the portion of the plug inserted in the aperture.

Fibers having diameters ranging between thirty to seventy hundred thousandths work quite satisfactorily. At ranges over seventy hundred thousandths it is found that the fibers although capable of being used are not sufficiently pliable to be properly formed into a sealant. At ranges under thirty hundred thousandths it is found that the fibers when formed into a sealant sinter upon use and are crushed and weakened. Furthermore, small sized fibers in the form of a sealant do not facilitate dissipation of heat by conduction and convection to the outside cooling air as readily owing to the greatly compacted condition of such fibers, when formed into a sealant as disclosed herein.

The construction of the sealant as herein disclosed with continuous filament glass fibers allows the structure to conform during both the preforming process and during the time the sealant is inserted for use by advantageously allowing the loops and networks to slip within each other thereby causing stresses on the sealant to be taken up in the slack formation rather than in the fibers themselves. In this manner the sealant conforms to the plug or any other form used without the fibers being damaged or unduly strained.

As an alternative to placing a fibrous glass sealant in place over the plug and allowing the metal to permeate the interstices of the sealant near the surface exposed to the metal, a metal bonded sealant can be employed. In this instance, the fibrous glass sealant has a metal binder applied consisting of the same metal with which the sealant is to be used. The binder only provides a crust of metal on the outer portion to be exposed to the melting metal, and does not permeate the entire sealant.

A further alternative is a preformed sealant with a suitable high temperature backing, precluding the necessity for having any plug or backing means behind the sealant.

It should be understood that various modifications may be resorted to and applied within the spirit of the invention and scope of the claims.

I claim:
1. In a molten metal receptacle wherein a tap hole in the wall of a receptacle is closed by a stopple conforming generally to the cross sectional shape of the tap hole the improvement comprising:
   a sealant for blocking the flow of molten metal from the tap hole interposed in overlying relation with the stopple and in communication with surfaces surrounding the tap hole, the sealant comprising a resilient porous network of glass fibers of sufficient length to impart a self integrating relation to the network, the network having a thickness to provide sufficient fibers and interstices to effectuate a cooling of at least a portion of the metal flowing into the porous network thereby forming a metal barrier precluding further passage of metal therethrough.

2. A sealant for a molten metal receptacle as described in claim 1 further comprising:
   a binder which maintains the network during placement in generally the same cross sectional shape as the stopple.

3. A sealant as described in claim 2 wherein the binder is a starch binder.

4. A sealant as described in claim 1 wherein the fibers are continuous.

5. A sealant as described in claim 2 wherein the diameter of the fibers is in a range between thirty hundred thousandths and seventy hundred thousandths of an inch.

References Cited

UNITED STATES PATENTS

| | | | |
|---|---|---|---|
| 1,651,445 | 12/1927 | Cushing | 266—42 |
| 2,676,823 | 4/1954 | Olson et al. | 277—227 X |
| 3,124,854 | 3/1964 | Dore | 266—42 X |

J. SPENCER OVERHOLSER, *Primary Examiner.*

E. MAR, *Assistant Examiner.*